(12) United States Patent
Kuri et al.

(10) Patent No.: US 9,702,018 B2
(45) Date of Patent: Jul. 11, 2017

(54) QUENCH TANK AND LIQUID METAL LOOP

(71) Applicants: MITSUBISHI HEAVY INDUSTRIES MECHATRONICS SYSTEMS, LTD., Kobe-shi, Hyogo (JP); OSAKA UNIVERSITY, Suita-shi, Osaka (JP)

(72) Inventors: Syuhei Kuri, Kobe (JP); Izuru Matsushita, Kobe (JP); Hiroshi Horiike, Suita (JP); Eiji Hoashi, Suita (JP); Isao Murata, Suita (JP); Sachiko Suzuki, Suita (JP); Itsuro Kato, Suita (JP)

(73) Assignees: MITSUBISHI HEAVY INDUSTRIES MECHATRONICS SYSTEMS, LTD., Kobe-shi (JP); OSAKA UNIVERSITY, Suita-shi (JP)

( * ) Notice: Subject to any disclaimer, the term of this patent is extended or adjusted under 35 U.S.C. 154(b) by 492 days.

(21) Appl. No.: 13/779,072

(22) Filed: Feb. 27, 2013

(65) Prior Publication Data
US 2014/0241481 A1 Aug. 28, 2014

(51) Int. Cl.
*C21D 1/64* (2006.01)
*G21B 1/11* (2006.01)
*G21K 5/08* (2006.01)

(52) U.S. Cl.
CPC ............. *C21D 1/64* (2013.01); *G21B 1/115* (2013.01); *G21K 5/08* (2013.01)

(58) Field of Classification Search
CPC ........ G21C 3/52; B01D 19/0057; C21D 1/64; B01F 15/00915; G21B 1/115
See application file for complete search history.

(56) References Cited

U.S. PATENT DOCUMENTS

| 2,349,944 A | * | 5/1944 | Dixon | ............................ 95/272 |
| 2,385,745 A | * | 9/1945 | Vogt | .......................... B04C 5/12 |
| | | | | 55/392 |

FOREIGN PATENT DOCUMENTS

| JP | 57-062604 A | 9/1980 |
| JP | 59-115705 A | 7/1984 |
| JP | 11-114453 A | 4/1999 |
| JP | 11-121422 A | 4/1999 |
| JP | 2001-33600 A | 2/2001 |
| JP | 2002-307054 A | 10/2002 |

OTHER PUBLICATIONS

Office Action dated May 26, 2015, issued in counterpart Japanese Application No. 2011-218635 (w/English translation) (6 pages).
Decision of a Patent Grant dated Mar. 1, 2016, issued in counterpart Japanese Patent Application No. 2011-218635, with English translation. (4 pages).

* cited by examiner

*Primary Examiner* — Jack W Keith
*Assistant Examiner* — Sharon M Davis
(74) *Attorney, Agent, or Firm* — Westerman, Hattori, Daniels & Adrian, LLP (57) ABSTRACT

There is provided a quench tank which is disposed in a circulation path of a liquid metal loop and separates and cools liquid metal steam or a mixed gas in liquid metal introduced into a tank body. The tank body includes a separating area which forms a substantially horizontal flow of the liquid metal, and a separating plate is disposed inside the tank body so as to be inclined with respect to the vertical direction.

3 Claims, 8 Drawing Sheets

QUENCH TANK AND LIQUID METAL LOOP

BACKGROUND OF THE INVENTION

1. Field of the Invention

The present invention relates to a quench tank which cools liquid metal such as liquid metal as a target to which a proton beam is irradiated in a neutron generator and a liquid metal loop which includes the quench tank.

2. Description of the Related Art

Figure 18:
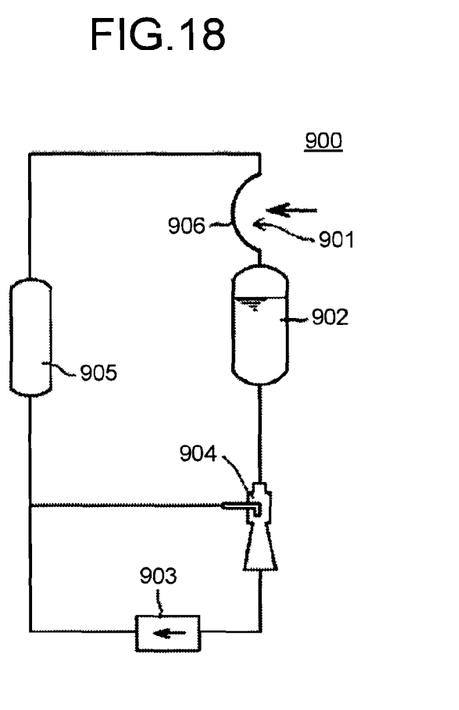
FIG. 18 is a configuration diagram illustrating a liquid metal loop of the related art.

Hitherto, a liquid metal loop disclosed in Japanese Laid-open Patent Publication No. 2001-33600 is known. FIG. 18 is a configuration diagram illustrating a liquid metal loop of the related art. A liquid metal loop 900 includes a target 901 which obtains a neutron by irradiating a proton beam thereto, a quench tank 902 which is disposed at the downstream side of the target 901, a circulating pump 903 which is connected to the quench tank 902, a jet pump 904 which is disposed between the quench tank 902 and the circulating pump 903, and a heat exchanger 905 which is disposed at the downstream side of the circulating pump 903. The target 901 forms a liquid metal membrane flow on a back plate 906 by pressing the liquid metal on the curved back plate 906 through a centrifugal force.

The liquid metal is ejected onto the back plate 906 by the function of the circulating pump 903 so as to form a liquid membrane thereon. The liquid metal which passes through the back plate 906 is returned to the quench tank 902 so as to be stored and cooled therein and is sent to the circulating pump 903 by the jet pump 904. Accordingly, the cavitation is prevented due to the increasing back pressure in the suction port of the circulating pump 903. Then, the liquid metal is supplied onto the back plate 906 again by the circulating pump 903. The proton beam is irradiated to the liquid membrane of the liquid metal ejected onto the back plate 906 and high-speed neutron is generated behind the target 901 by burnup.

In the structure of the liquid metal loop 900 of the related art, the liquid metal directly enters the liquid metal bulk from the tube inserted into the liquid metal of the quench tank 902, and hence the bubbles are mixed in the liquid metal. Since the diameter of the bubble is small and the rising speed thereof is slow, the bubbles circulate inside a loop while being contained in the liquid metal. Further, since an area where the liquid metal stays is needed so as to remove the bubbles, the device increases in size.

SUMMARY OF THE INVENTION

According to a first aspect of the present invention, there is provided a quench tank which is disposed in a circulation path of a liquid metal loop and separates and cools liquid metal steam or a mixed gas in liquid metal introduced into a tank body, wherein the tank body includes a separating area which forms a substantially horizontal flow of the liquid metal, and a separating plate is disposed inside the tank body so as to be inclined with respect to the vertical direction.

According to a second aspect of the present invention, there is provided a quench tank which is disposed in a circulation path of a liquid metal loop and separates and cools liquid metal steam or a mixed gas in liquid metal introduced into a tank body, wherein the tank body includes a separating area which forms a substantially horizontal flow of the liquid metal, and a separating plate which is formed as a mesh plate or a plate with a plurality of holes is disposed inside the tank body so that the separating plate is substantially horizontal to the flow direction of the liquid metal.

According to a third aspect of the present invention, there is provided a quench tank which is disposed in a circulation path of a liquid metal loop and separates and cools a liquid metal steam or a mixed gas in liquid metal introduced into a tank body, wherein the tank body includes a separating area which forms a substantially horizontal flow of the liquid metal, and a separating plate which is formed as a mesh plate or a plate with a plurality of holes is disposed inside the tank body so as to be inclined in the vertical direction.

According to a fourth aspect of the present invention, there is provided a quench tank which is disposed in a circulation path of a liquid metal loop and separates and cools liquid metal steam or a mixed gas in liquid metal introduced into a tank body, wherein the tank body includes a separating area which forms a substantially horizontal flow of the liquid metal, and a separating plate is provided inside the tank body so as to be curved about an axis in the length direction such that the cross-section thereof has at least one inverse concave shape and a hole is provided near a center as an apex and/or near a hillside.

According to a fifth aspect of the present invention, there is provided a quench tank which is disposed in a circulation path of a liquid metal loop and separates and cools liquid metal steam or a mixed gas in liquid metal introduced into a tank body, wherein the quench tank includes a separating area which is connected to the tank body and forms a substantially vertical flow of the liquid metal, and a separating plate is disposed inside the separating area so that a predetermined gap is formed between a bottom of the separating plate and a bottom surface of the separating area, the separating plate being formed in a concave shape and having a hole provided near the center of the bottom and a small hole provided at a hillside portion between the edge and the bottom, wherein an inlet which introduces the liquid metal from the tank body is provided between the bottom surface and the separating plate inside the separating area, and an outlet of the liquid metal is provided above the separating plate in the separating area.

According to a six aspect of the present invention, there is provided a quench tank which is disposed in a circulation path of a liquid metal loop and separates and cools liquid metal steam or a mixed gas in liquid metal introduced into a tank body, wherein a separating plate which is formed as a punching metal plate or a mesh plate is disposed at the lower portion inside the tank body in the vertical direction.

According to a seventh aspect of the present invention, there is provided a liquid metal loop including: the quench tank according to the first aspect; and a target forming portion which forms a target by ejecting a liquid metal supplied from the quench tank to a proton beam irradiation space.

According to an eighth aspect of the present invention, there is provided a liquid metal loop including: the quench tank according to the first aspect; and a target forming portion which forms a target by ejecting a liquid metal supplied from the quench tank to a proton beam irradiation space.

DETAILED DESCRIPTION OF THE PREFERRED EMBODIMENTS (First Embodiment)

Figure 1:
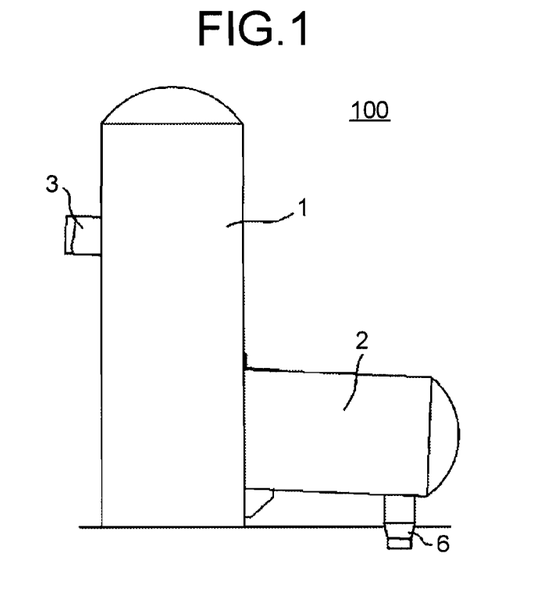
FIG. 1 is a front view illustrating a quench tank according to a first embodiment of the invention.
Figure 2:
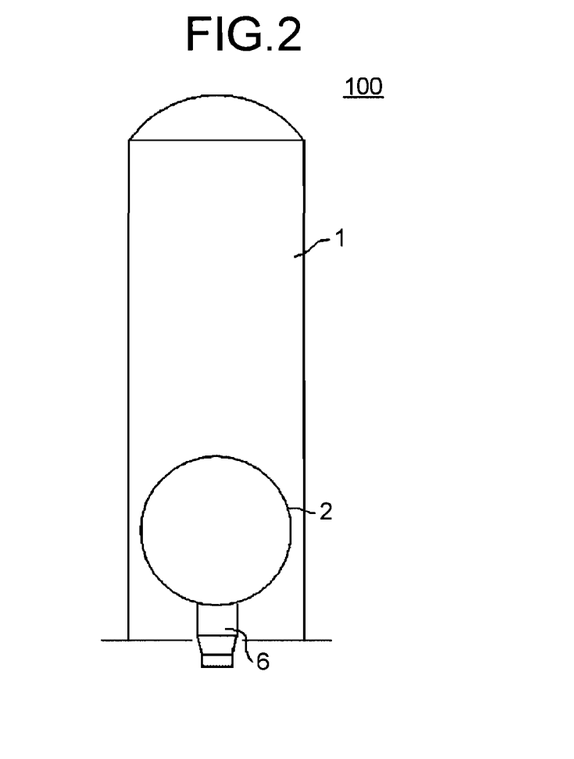
FIG. 2 is a side view of the quench tank illustrated in FIG. 1.
Figure 3:
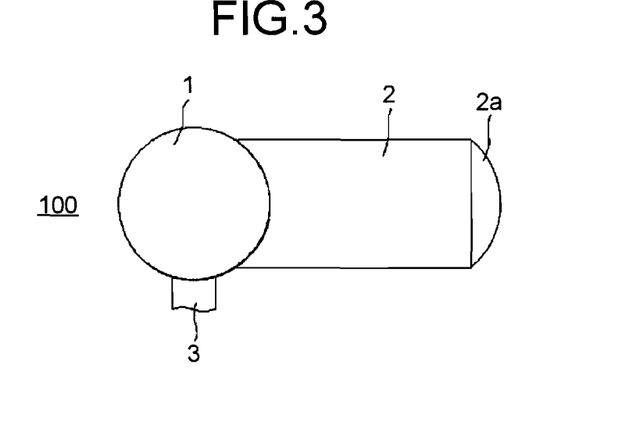
FIG. 3 is a top view of the quench tank illustrated in FIG. 1.
Figure 4:
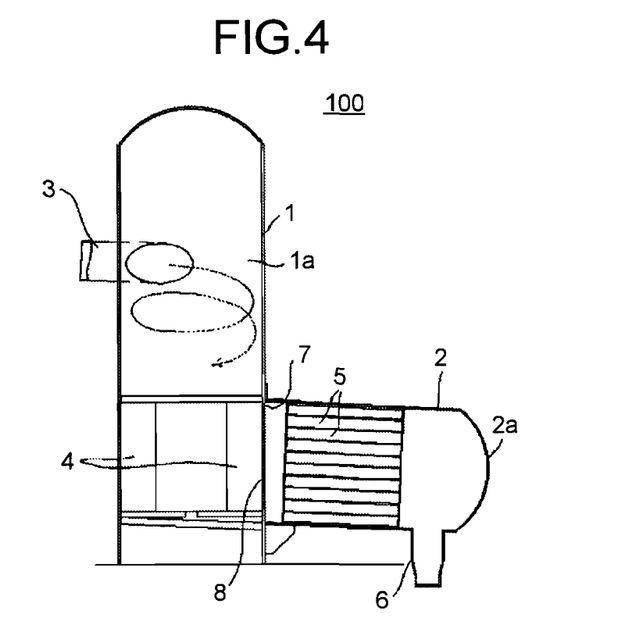
FIG. 4 is a cross-sectional view of the quench tank illustrated in FIG. 1.

FIG. 1 is a front view illustrating a quench tank according to a first embodiment of the invention. FIG. 2 is a side view of the quench tank illustrated in FIG. 1, and FIG. 3 is a top view. FIG. 4 is a cross-sectional view of the quench tank illustrated in FIG. 1. A quench tank 100 includes a tank body 1 which is connected to a receiving portion of a target forming portion for forming a liquid metal target by a tube and a cylindrical body 2 which is formed in the lower portion of the tank body 1 in the substantially horizontal direction.

The tank body 1 is a structure which is formed in a cylindrical shape by sheet-metal processing. A tube 3 which extends from the target forming portion is provided at the upper side surface of the tank body 1 in a direction tangent to the cylinder of the tank body 1. Accordingly, the liquid metal which is introduced from the tube 3 enters a free liquid level while rotating along an inner surface 1a of the tank body 1 (the flow of the liquid metal is indicated by the dotted arrow in the drawing). The target forming portion includes a nozzle which ejects the liquid metal in plane so as to come across an irradiation area of a proton beam and a receiving portion which is formed as a diffuser for receiving the ejected liquid metal.

At the lower portion of the tank body 1, four rectification plates 4 are radially provided about the cylindrical axis with a void at the center portion thereof. The rectification plate 4 may be a flat plate, and also may be a mesh plate or a punching metal plate. The number of the rectification plates 4 is not limited to four.

Figure 5A:
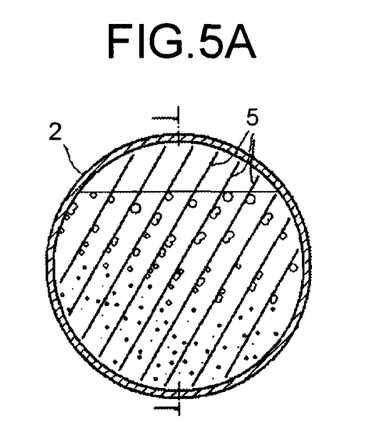
FIG. 5A and FIG. 5B are cross-sectional views illustrating a cylindrical body of the quench tank illustrated in FIG. 1.
Figure 5B:
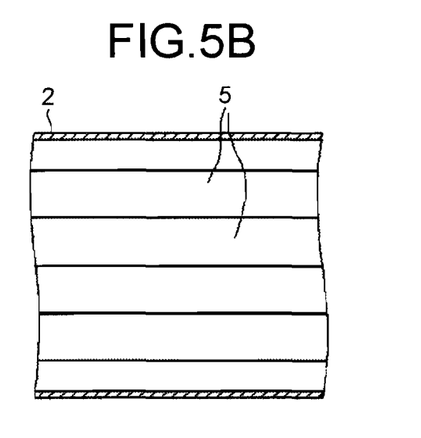

The cylindrical body 2 is slightly inclined with respect to the tank body 1 so that a front end 2a is directed downward. Inside the cylindrical body 2, as illustrated in FIG. 5, a plurality of separating plates 5 which are inclined with respect to the vertical direction are arranged. The interval between the adjacent separating plates 5 is defined by the bubble rising speed and the cylindrical body staying time, and specifically, it is desirable that the interval be from 3 cm to 5 cm. The angle of each separating plate 5 is not limited thereto, but as illustrated in FIG. 5(a), it is desirable that the angle be from 45° to 60° with respect to the vertical direction taken along the axial direction of the tank body 1. Further, the separating plates 5 are provided substantially throughout the entire length of the cylindrical body 2 as illustrated in FIG. 5(b). The length of the cylindrical body 2 is defined based on the bubble separating capability.

An outlet 6 of the liquid metal is provided at the downstream side of the separating plates 5. The tube which is connected to the outlet 6 is connected to a pump which constitutes a liquid metal loop. The tube which extends from the pump is connected to the target forming portion through a heat exchanger so as to form the liquid metal loop as a whole.

Next, the movement of the liquid metal inside the quench tank will be described. The liquid metal of which the temperature is increased by the irradiation of the proton beam from the target forming portion is introduced into the tank body 1 through the tube 3. Since the tube 3 is connected in the direction tangent to the cylinder of the tank body 1, the introduced liquid metal enters the free liquid level while circumferentially rotating along the inner surface 1a of the tank body 1. At this time, the bubbles enter from the free liquid level.

The liquid metal which enters the free liquid level in a rotating state moves inside the tank body 1 so as to swirl therein, but the rotation of the liquid metal is restricted by the rectification plates 4 provided at the lower portion inside the body, so that the liquid metal stays at the lower portion of the tank body 1. The lower side surface of the tank body 1 is provided with a hole 7 which corresponds to the cylindrical body 2, and the tank body 1 communicates with the cylindrical body 2 by the hole 7. The hole 7 is provided with a second rectification plate 8 which is formed as a mesh plate or a punching metal plate. As the liquid metal flows in the length direction of the cylindrical body 2, the bubbles contained in the liquid metal rise as illustrated in FIG. 5(a). Since the separating plates 5 are disposed inside the cylindrical body with a predetermined narrow interval, the bubbles slightly rise so as to come into contact with the surfaces of the separating plates 5, so that the bubbles are combined with each other so as to grow.

Due to the growth of the bubbles, the buoyant force increases, the bubble rising speed increases, and the bubbles rise so as to roll along the lower surfaces of the inclined surfaces of the separating plates 5. Even at this time, the bubbles grow while being combined with the peripheral bubbles, and the larger bubbles are formed until the bubbles reach the free liquid level. Such a phenomenon occurs between the respective separating plates 5. The grown bubbles disappear at the free liquid level while the liquid metal flows in the length direction of the cylindrical body 2. When the bubbles grow so that the rising speed becomes fast, the bubbles rise in a short time by the fast rising speed, and hence it is possible to efficiently remove the bubbles and to shorten the length of the cylindrical body 2.

Further, when the liquid metal is ejected so as to form the target, the bubbles may be easily mixed with the liquid metal in the receiving portion. For this reason, the removal of the bubbles in the cylindrical body 2 is extremely useful for the case where the target of the liquid metal jet flow is used.

The liquid metal from which the bubbles are removed is extracted through the tube from the outlet 6 which is provided at the lower portion of the front end of the cylindrical body 2 and is sent to the pump. The pump supplies the liquid metal to the target forming portion again.

As described above, according to the quench tank 100 of the invention, the plurality of separating plates 5 are provided inside the cylindrical body 2, and hence the bubbles are grown so as to be removed fast by the separating plates 5 while the liquid metal flows. Accordingly, it is possible to shorten the length of the cylindrical body 2 and to decrease the size of the quench tank 100.

Furthermore, the target forming portion may be of a type in which a liquid membrane is formed by causing the liquid metal to flow at a high speed onto the back plate that is curved as in the related art.

(Second Embodiment)

Figure 6A:
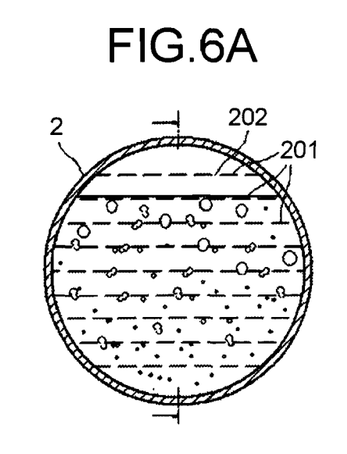
FIG. 6A and FIG. 6B are cross-sectional views illustrating a cylindrical body of a quench tank according to a second embodiment of the invention.
Figure 6B:
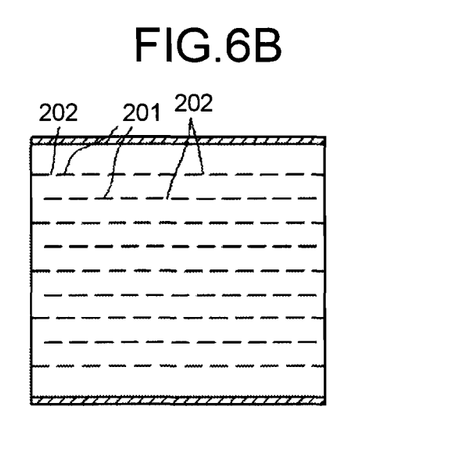

FIG. 6 is a cross-sectional view illustrating a cylindrical body of a quench tank according to a second embodiment of the invention. The quench tank has substantially the same configuration as that of the first embodiment, but the shape and the arrangement of the separating plate 5 are different. Since the other configurations are the same as those of the quench tank 100 of the first embodiment, the description thereof will not be repeated. In the quench tank, a punching metal plate with a plurality of holes 202 is provided as a separating plate 201, and a plurality of the punching metal plates are substantially arranged in the horizontal direction. The liquid metal which flows out of the tank body 1 passes between the layers of the plurality of separating plates 201. The bubbles contained in the liquid metal come into contact with the rear surfaces of the respective separating plates 201, and here, the bubbles are combined with each other so as to grow. The buoyant force of the grown bubbles increases, and the bubbles rise through the holes 202 of the separating plates 201. Then, even in the separating plate 201 of the upper layer, the bubbles are further adsorbed to the other bubbles so as to grow, and the bubbles rise through the holes 202. Finally, the largely grown bubbles disappear at the free liquid level of the liquid metal inside the cylindrical body 2.

In this way, since the bubbles grow and the rising speed increases even by the separating plate 201 which is formed as the punching metal plate, the horizontal distance necessary for separating the bubbles is shortened. For this reason, since it is possible to shorten the cylindrical body, it is possible to decrease the size of the quench tank.

Further, although it is not illustrated in the drawings, the same operation and effect may be obtained even when the separating plate 201 is formed by the mesh plate. Specifically, when the bubbles come into contact with the surface of the mesh plate and the bubbles grow, the bubble rising speed increases. Further, the grown bubbles have a large buoyant force, move to the upper layer through the mesh openings so as to further grow, and disappear at the free liquid level of the liquid metal. In this way, when the bubbles grow and the rising speed becomes fast, the bubbles are removed in a short time by the fast rising speed. Accordingly, it is possible to efficiently remove the bubbles and to shorten the length of the cylindrical body. The optimal mesh opening is defined depending on the capacity of the tank or the flow rate of the liquid metal.

Further, the separating plate 5 of the first embodiment may be provided as the separating plate 201 which is formed as the punching metal plate or the mesh plate. In this case, in addition to the above-described operation and effect, since the bubbles grow while rising in the inclined direction, it is possible to further improve the bubble removing efficiency.

(Third Embodiment)

Figure 7:
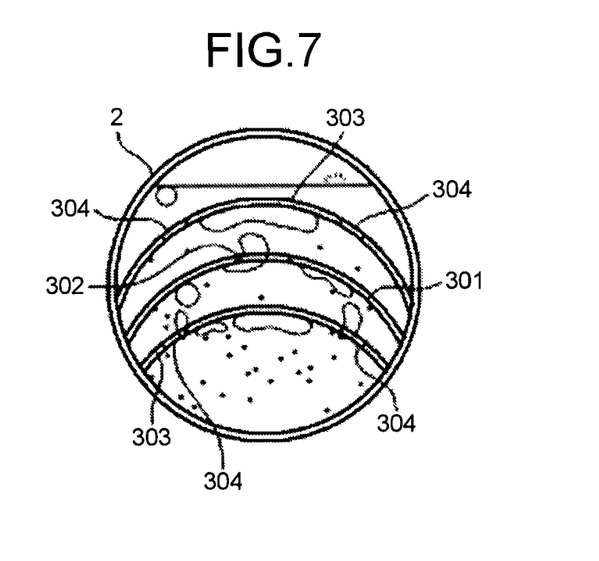
FIG. 7 is a cross-sectional view illustrating a cylindrical body of a quench tank according to a third embodiment of the invention.
Figure 8:
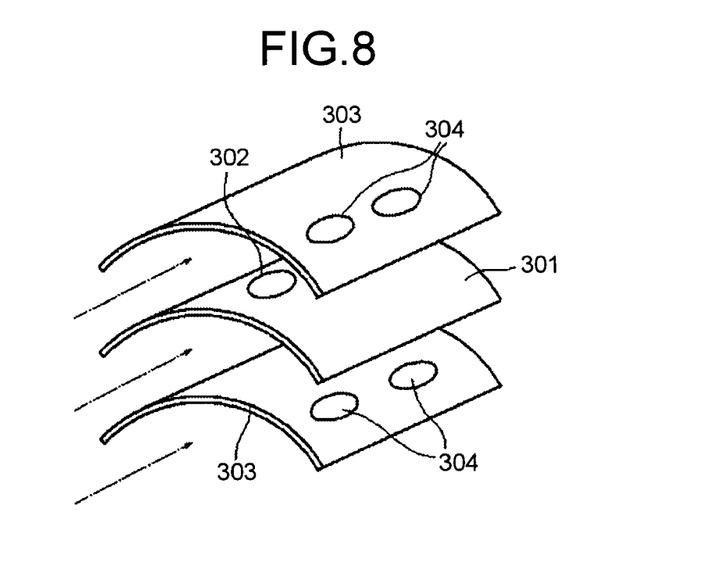
FIG. 8 is a diagram illustrating an arrangement state of a separating plate.

FIG. 7 is a cross-sectional view illustrating a cylindrical body of a quench tank according to a third embodiment of the invention. FIG. 8 is a diagram illustrating an arrangement state of the separating plate. The quench tank according to the third embodiment has substantially the same configuration as that of the first embodiment, but the shape and the arrangement of a separating plate 301 are different. Since the other configurations are the same as those of the quench tank 100 of the first embodiment, the description thereof will not be repeated. In the quench tank 100, a separating plate 301 is curved about the axis in the length direction, where the cross-section is formed in an inverse concave dish shape and a plurality of holes 302 are provided in the vicinity of the apex in the length direction. Further, another separating plate 303 is curved about the axis in the length direction, where the cross-section is formed in an inverse concave dish shape and a hole 304 is provided on halfway between the apex and the edge. The separating plates 301 and 303 are alternately stacked, but the holes 302 and 304 are arranged so as to be deviated from each other in the vertical direction.

As illustrated in FIG. 8, the liquid metal which flows from the hole 7 of the cylindrical body 2 contains minute bubbles. The bubbles rise so as to come into contact with the separating plates 301 and 303 while flowing inside the cylindrical body 2. Since the separating plates 301 and 303 are curved about the axis in the length direction, the bubbles move so as to be collected in the vicinity of the center, and the bubbles grow while being combined with each other in the meantime.

At the rear surface of the separating plate 301, the grown bubbles advance to the apex due to the increased buoyant force and the bubbles come out of the hole 302. Further, at the rear surface of the separating plate 303, the grown bubbles increase and a part of the bubbles come out of the upper portion of the hole 304 at the middle portion. In the separating plates 301 and 303, since the separating plates 301 and 303 are arranged so as to deviate the holes 302 and 304, the bubbles which come out of the holes 302 and 304 come into contact with the upper separating plates 301 and 303, further grow, and rise from the holes 302 and 304 of the separating plates 301 and 303. Then, the bubbles disappear at the free liquid level of the liquid metal.

With such a configuration, since the separating plates 301 and 303 are curved so as to collect the bubbles at the center, the bubbles may be further easily grown. When the bubbles grow and the rising speed becomes fast, the bubbles are removed in a short time by the fast rising speed, and hence the length of the cylindrical body 2 is shortened. Accordingly, it is possible to decrease the size of the quench tank.

(Fourth Embodiment)

Figure 9:
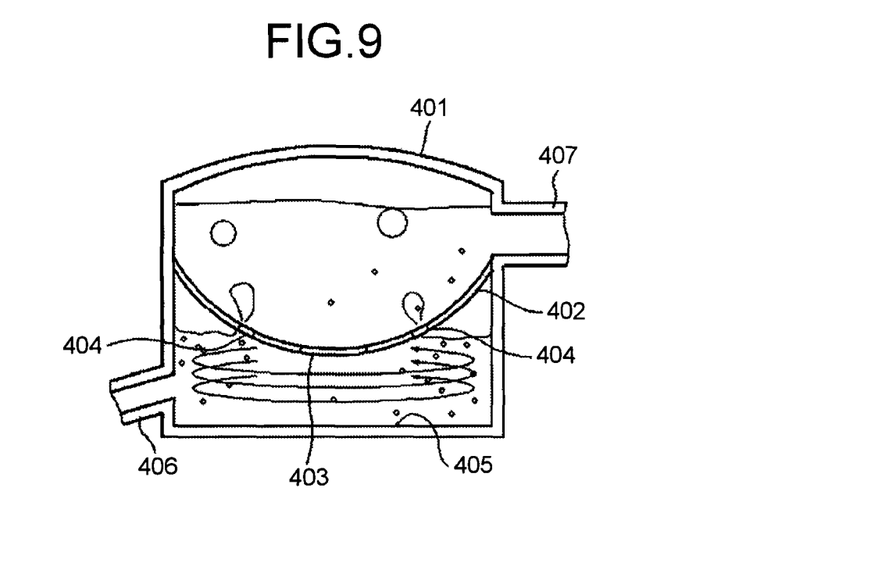
FIG. 9 is a configuration diagram illustrating a part of a quench tank according to a fourth embodiment of the invention.

FIG. 9 is a configuration diagram illustrating a part of a quench tank according to a fourth embodiment of the invention. A cylindrical body 401 of the quench tank has therein a separating plate 402. The separating plate 402 is formed in a concave dish shape, where a hole 403 is provided in the vicinity of the center as the dish bottom, a plurality of small holes 404 are provided between the dish edge and the dish bottom, and a predetermined gap is formed between the dish bottom and the bottom surface of the cylindrical body 401. Further, an inlet 406 which introduces the liquid metal is provided between the separating plate 402 and a bottom surface 405 inside the cylindrical body 401, and an outlet 407 of the liquid metal is provided at the upper side of the separating plate 402 of the cylindrical body 401. The cylindrical body 401 is connected to the tank body 1 by the tube connected to the inlet 406.

In the cylindrical body 401, the liquid metal which is introduced from the tank body 1 flows in a rotating state between the separating plate 402 and the bottom surface 405. Since the separating plate 402 is formed in a dish shape, the bubbles moving along with the liquid metal grow at the surface of the separating plate 402, and rise along the surface of the separating plate 402 since the separating plate is curved. Then, the bubbles grow between the separating plate 402 and the wall of the cylindrical body 401 so as to be collected. When the amount of the bubbles increases, the free liquid level is formed at the area. When the bubbles are collected, the bubbles come out of the small hole 404 at the hillside portion and the bubbles are enlarged. Accordingly, the bubbles rise promptly and disappear at the free liquid level.

The liquid metal rotates at the lower side of the separating plate 402. In another viewing point, the liquid metal passes the lower side of the separating plate which is inclined in the vertical direction. Since the liquid metal moves upward through the hole 403 near the center as the dish bottom or the small hole 404 at the hillside portion and is extracted from the outlet 407, the bubbles moving along with the liquid metal may be separated inside the cylindrical body 401. Further, since the liquid metal rotates between the separating plate 402 and the bottom surface 405, it is possible to obtain a sufficient time necessary for the collision, the growth, and the separation of the bubbles even in the upward vessel-like cylindrical body 401. For this reason, it is possible to efficiently remove the bubbles and to decrease the size of the quench tank.

Furthermore, although it is not illustrated in the drawings, a plurality of the separating plates 402 may be stacked.

(Fifth Embodiment)

Figure 10A:
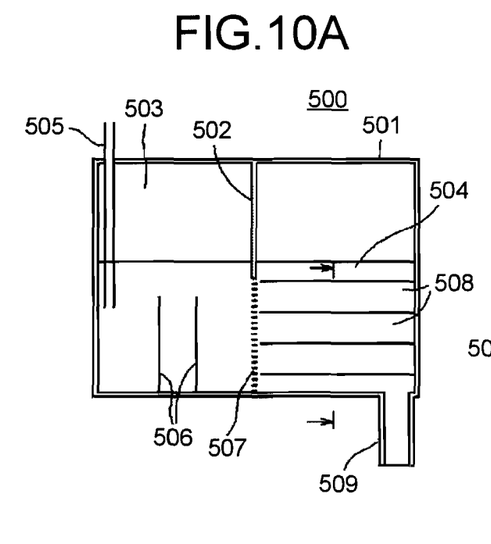
FIG. 10A and FIG. 10B are configuration diagrams illustrating a quench tank according to a fifth embodiment of the invention.
Figure 10B:
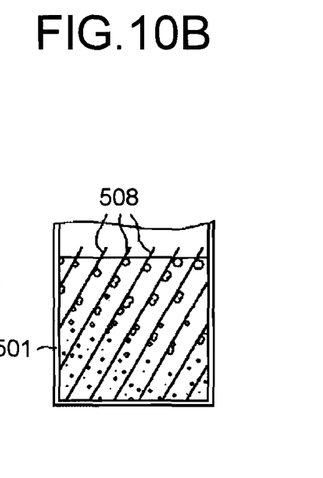

FIG. 10 is a configuration diagram illustrating a quench tank according to a fifth embodiment of the invention, where FIG. 10(*a*) is a cross-sectional view in the length direction and FIG. 10(*b*) is a cross-sectional view in the perpendicular direction thereof. In a quench tank 500, a body 501 is formed in a box shape, and a partition 502 is provided at the middle position therein. By the partition 502, the left side in the drawing becomes a storage portion 503 (corresponding to the tank body 1 of the first embodiment) and the right side in the drawing becomes a separating area 504 (corresponding to the cylindrical body 2). As for the method of introducing the liquid metal into the storage portion 503, the liquid metal is directly introduced into the free liquid level by a tube 505 as not in the first embodiment.

The storage portion 503 is provided with one or a plurality (in the example of the drawing, a pair) of rectification plates 506 arranged in the vertical direction. The position of the rectification plate 506 is defined based on the flow of the liquid metal which is derived from a tube 505. The rectification plate 506 may be a flat plate or may be also a mesh plate or a punching metal plate. The lower portion of the partition 502 is provided with a second rectification plate 507 which divides the storage portion 503 and the separating area 504 from each other. The second rectification plate 507 is formed as a punching metal plate or a mesh plate.

As illustrated in FIG. 10, the separating area 504 is provided with a plurality of separating plates 508 which are inclined with respect to the vertical direction. The interval between the adjacent separating plates 508 is defined based on the bubble rising speed and the cylindrical body staying time, and specifically, it is desirable that the interval be from 3 cm to 5 cm. The angle of the separating plate 508 is not limited thereto, but as illustrated in FIG. 10(*a*), it is desirable that the angle be from 45° to 60° with respect to the vertical direction. Further, as illustrated in FIG. 10(*b*), the separating plates 508 are substantially provided in the entire length of the separating area 504. The length of the separating area 504 is defined based on the bubble separating capability.

An outlet 509 of the liquid metal is provided at the downstream side of the separating plate 508. The tube which is connected to the outlet 509 is connected to a pump constituting a liquid metal loop. The tube which extends from the pump is connected to a target forming portion through a heat exchanger and forms the liquid metal loop as a whole.

Next, the movement of the liquid metal inside the quench tank will be described. The liquid metal to which the proton beam is irradiated from the target forming portion so that the temperature thereof increases is introduced into the storage portion 503 through the tube 505. The liquid metal which is introduced into the storage portion 503 is introduced from the upside of the free liquid level or the downside of the free liquid level. The movement of the liquid metal which is introduced into the storage portion 503 is evenly adjusted by the rectification plate 506 and the liquid metal passes through the space below the partition 502. Then, the liquid metal moves to the separating area 504 while being rectified by the second rectification plate 507.

In the separating area 504, as illustrated in FIG. 10(*b*), the bubbles gradually rise as the liquid metal flows. Since the separating plates 508 are arranged inside the separating area 504 at a predetermined narrow interval, the bubbles slightly rise so as to come into contact with the surface of the separating plate 508, so that the bubbles grow while being combined with each other.

Due to the growth of the bubbles, the buoyant force increases and the bubble rising speed increases, so that the bubbles rise so as to press the lower side of the inclined surface of the separating plate 508. Even at this time, the bubbles grow while being combined with the peripheral bubbles so as to form the large bubbles. Such a phenomenon occurs between the respective separating plates 508. The grown bubbles disappear at the free liquid level while the liquid metal flows in the length direction of the separating area 504. In this way, when the bubbles grow and the rising speed becomes fast, the bubbles are removed in a short time by the fast rising speed. Accordingly, it is possible to efficiently remove the bubbles and to shorten the length of the separating area 504. The liquid metal from which the bubbles are removed is extracted from the outlet 509 through the tube and is sent to the pump. The pump supplies the liquid metal to the target forming portion again.

Even in the quench tank 500, it is possible to grow the bubbles by the separating plate 508 so that the bubbles are removed fast. Accordingly, it is possible to shorten the length of the separating area 504 and to decrease the size of the quench tank 500.

(Sixth Embodiment)

Figure 11:
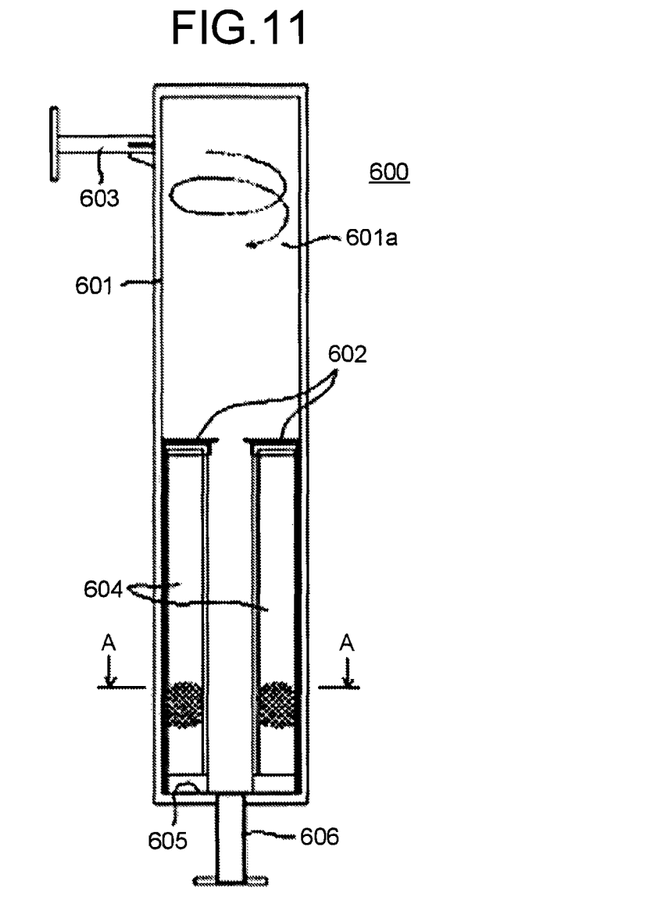
FIG. 11 is a cross-sectional view illustrating a quench tank according to a sixth embodiment of the invention.
Figure 12:
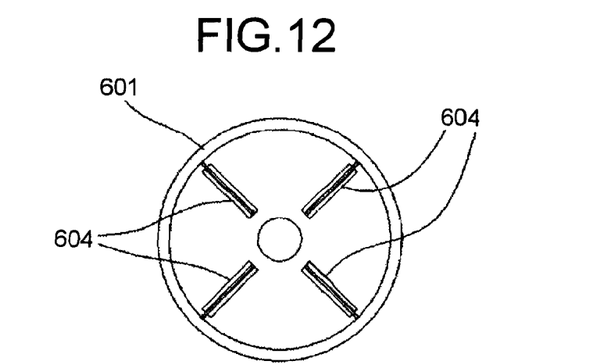
FIG. 12 is a cross-sectional view taken along the line A-A of FIG. 11.

FIG. 11 is a cross-sectional view illustrating a quench tank according to a sixth embodiment of the invention. FIG. 12 is a cross-sectional view taken along the line A-A of FIG. 11. In a quench tank 600, a tank body 601 is formed in a cylindrical shape and the upper portion is connected with a tube 603 from the target forming portion described above. Further, the tube 603 is provided in a direction tangent to the cylinder. Accordingly, the liquid metal which is introduced from the tube 603 enters the free liquid level while rotating along an inner surface 601a of the tank body 601.

At the lower portion of the tank body 601, four rectification plates 604 are radially provided about the cylindrical axis with a void at the center portion thereof. It is desirable that the rectification plate 604 be formed as a mesh plate so as to promote the adhesion of the bubbles. Furthermore, the rectification plate may be also a punching metal plate with a plurality of small-diameter holes. The number of rectification plates 604 is not limited to four. In the rectification plate 604, the upper portion thereof is supported by a support plate 602 and the lower potion thereof is supported by a bottom surface 605 of the tank body 601. The length of the rectification plate 604 is defined based on the demanded bubble removing capability.

The bottom surface 605 of the tank body 601 is provided with an outlet 608 of the liquid metal. The tube which is connected to the outlet 608 is connected to a pump which constitutes a liquid metal loop. The tube which extends from the pump is connected to a target forming portion through a heat exchanger so that the liquid metal loop is formed as a whole.

Next, the movement of the liquid metal inside the quench tank will be described. The liquid metal to which the proton beam is irradiated from the target forming portion so that the temperature thereof increases is introduced into the tank body 601 through the tube 603. Since the tube 603 is connected in a direction tangent to the cylinder of the tank body 601, the introduced liquid metal enters the free liquid level while rotating along the inner surface of the tank body 601. At this time, the bubbles enter from the free liquid level.

The liquid metal which enters the free liquid level in a rotating state moves inside the tank body 601 so as to swirl therein, but the rotation of the liquid metal is restricted by the rectification plate 604 provided at the lower portion inside the body, so that the liquid metal stays at the lower portion of the tank body 601. The bubbles contained in the liquid metal adhere to the rectification plate 604 while coming into contact therewith, and grow while being combined with the adjacent bubbles. The grown bubbles rise along the rectification plate 604 due to the larger buoyant force. In the meantime, the bubbles receive the small bubbles therearound, and continuously grow. The rising speed of the grown bubbles inside the liquid metal increases, so that the bubbles eventually disappear at the free liquid level inside the tank body 601.

Meanwhile, the liquid metal from which the bubbles are removed is extracted from the outlet 608 provided in the bottom surface 605 through the tube, and is sent to the pump. The pump supplies the liquid metal to the target forming portion again.

As described above, according to the quench tank 600 of the invention, the lower portion of the tank body 601 is provided with the plurality of separating plates 604. Then, the bubbles are grown by the separating plate 604 while the liquid metal flows, so that the bubbles are removed fast. Accordingly, it is possible to decrease the separating area of the bubbles compared to the case where the bubbles naturally rise. For this reason, it is possible to decrease the size of the quench tank 600.

(Seventh Embodiment)

Figure 13:
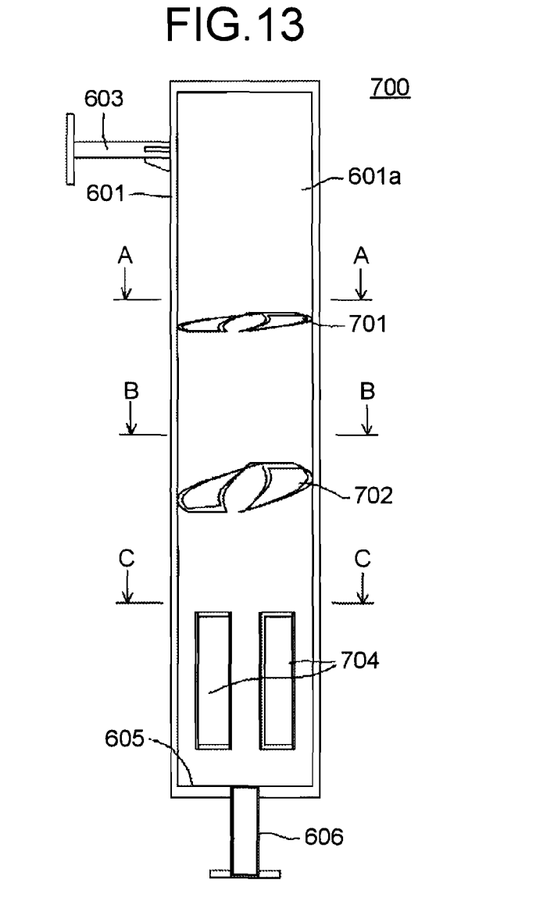
FIG. 13 is a cross-sectional view illustrating a quench tank according to a seventh embodiment of the invention.

FIG. 13 is a cross-sectional view illustrating a quench tank according to a seventh embodiment of the invention.

Figure 14:
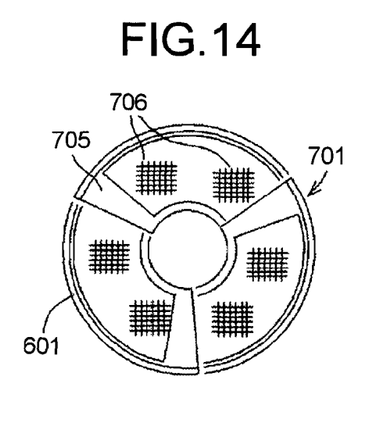
FIG. 14 is a cross-sectional view taken along the line A-A of FIG. 13.
Figure 15:
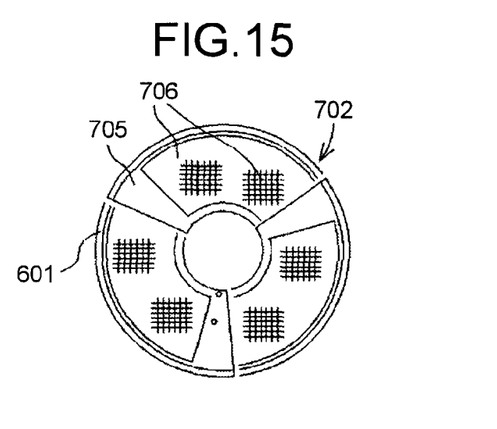
FIG. 15 is a cross-sectional view taken along the line B-B of FIG. 13.
Figure 16:
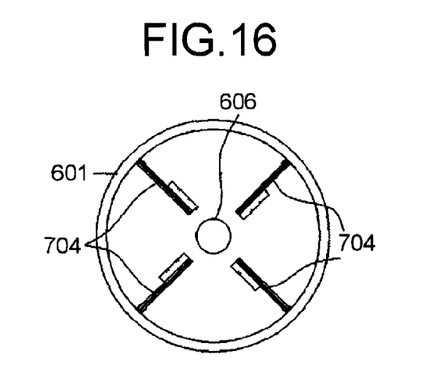
FIG. 16 is a cross-sectional view taken along the line C-C of FIG. 13.

FIG. 14 is a cross-sectional view taken along the line A-A of FIG. 13, FIG. 15 is a cross-sectional view taken along the line B-B of FIG. 13, and FIG. 16 is a cross-sectional view taken along the line C-C of FIG. 13. A quench tank 700 has substantially the same configuration as that of the quench tank 600 of the sixth embodiment, but is characterized in that the dimension of a rectification plate 704 is small and a vane-like rectification plate is provided on the rectification plate 704. Since the other configurations are the same as those of the quench tank 600 of the sixth embodiment, the description thereof will not be repeated and the same reference numerals will be given to the same components. The quench tank 700 includes an upper vane 701 and a lower vane 702, and each of the upper vane 701 and the lower vane 702 includes three vanes.

The upper vane 701 and the lower vane 702 have a predetermined inclined shape, and the surface of the vane has a configuration in which a mesh member 706 is provided inside a metal plate frame 705. The inclination angles of the upper vane 701 and the lower vane 702 are defined based on the flow angle of the inner wall of the tank body 601 of the liquid metal. The inclination angle of the upper vane 701 is gentler than that of the lower vane 702.

In the liquid metal which flows along the inner wall 601a of the tank body 601, the flow angle with respect to the vertical direction gradually becomes smaller until the liquid metal reaches from the upper portion to the vicinity of the center. Since the introduced liquid metal strongly circumferentially rotates at the upper portion of the tank body 601, the liquid metal flows at a large angle with respect to the vertical direction. For this reason, the inclination angle of the upper vane 701 is set to be large in accordance with the flow of the liquid metal.

Even in the lower vane 702, the inclination angle is set in accordance with the angle of the flow of the liquid metal in the vicinity of the center of the tank body 601 as described above. Four rectification plates 704 which are provided at the lower portion of the tank body 601 are slightly smaller than those of the sixth embodiment. The function of the rectification plate 704 is the same as that of the sixth embodiment.

The movement of the liquid metal inside the quench tank will be described. The liquid metal to which the proton beam is irradiated from the target forming portion so that the temperature thereof increases is introduced into the tank body 601 through the tube 603. Since the tube 603 is connected in a direction tangent to the cylinder of the tank body 601, the introduced liquid metal circumferentially rotates along the inner surface of the tank body 601.

The liquid metal is guided by the upper vane 701 and the circumferential rotation direction is maintained. Specifically, the upper vane 701 maintains the flow direction of the liquid metal at the inner surface of the tank body 601 so that the liquid metal does not fall while suddenly changing the angle thereof. Subsequently, the flow direction of the liquid metal is further maintained by the lower vane 702, so that the liquid metal is smoothly introduced into the free liquid level at last. The rotation of the liquid metal is restricted by the rectification plate 704 which is provided at the lower side inside the tank body 601, so that the liquid metal stays at the lower portion of the tank body 601. The bubbles contained in the liquid metal adhere to the rectification plate 704 while coming into contact therewith, and grow while being combined with the adjacent bubbles.

The grown bubbles rise along the rectification plate 704 due to the larger buoyant force. In the meantime, the bubbles receive the small bubbles therearound, and continuously grow. The rising speed of the grown bubbles inside the liquid metal increases, so that the bubbles eventually disappear at the free liquid level inside the tank body 601.

Meanwhile, the liquid metal from which the bubbles are removed is extracted from the outlet 608 provided in the bottom surface 605 through the tube, and is sent to the pump. The pump supplies the liquid metal to the target forming portion again.

As described above, according to the quench tank 700 of the invention, since it is possible to smoothen the speed at which the liquid metal enters the free liquid level by the upper vane 701 and the lower vane 702, the bubbles are hardly generated. Further, since the bubbles are removed fast by growing the bubbles using the separating plate 704, it is possible to decrease the bubble separating area compared to the case where the bubbles naturally rise. For this reason, it is possible to decrease the size of the quench tank 700.

(Eighth Embodiment)

Figure 17:
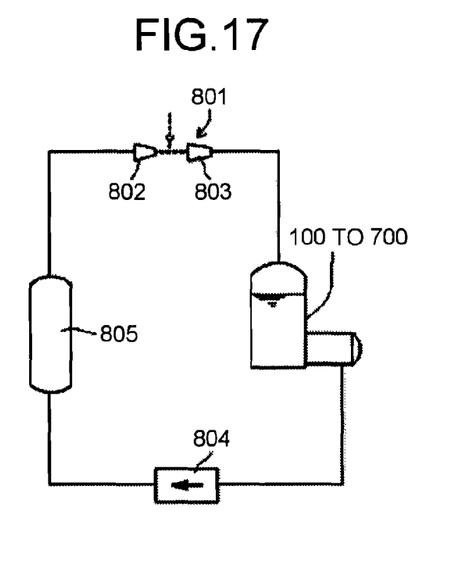
FIG. 17 is a configuration diagram illustrating a liquid metal loop of the invention.

FIG. 17 is a configuration diagram illustrating a liquid metal loop of the invention. In a liquid metal loop 800, a circulation path is provided with the quench tanks 100 to 700 according to the first to seventh embodiments. A target forming portion 801 of the liquid metal loop 800 includes a nozzle 802 which ejects the liquid metal in plane so as to come across the irradiation area of the proton beam and a receiving portion 803 which is formed as a diffuser for receiving the ejected liquid metal. For this reason, the bubbles may be easily mixed in the receiving portion 803. The bubbles contained in the liquid metal are removed in the quench tanks 100 to 700. The liquid metal from which the bubbles are removed is sent to a downstream pump 804, passes through a heat exchanger 805, and is sent to the target forming portion 801 again.

According to the liquid metal loop 800, since the target is formed by the jet flow of the liquid metal, there is no need to provide the back plate behind the membrane flow of the liquid metal as in the related art. For this reason, it is possible to suppress the damage of the neutron with respect to the structure. The quench tanks 100 to 700 are suitable for the target forming portion 801.

In the first embodiment of the present invention, the bubbles such as steam or a mixed gas moving along with the liquid metal rise so as to come into contact with the separating plate provided in the inclined direction while the liquid metal flows substantially in the horizontal direction inside the cylindrical body, and the bubbles grow while being combined with each other on the surface of the separating plate. Since the rising speed of the grown bubbles becomes fast, the bubbles rise along the surface of the separating plate in a direction perpendicular to the liquid metal flow, and disappear at the free liquid level. Accordingly, it is possible to separate the bubbles moving along with the liquid metal inside the cylindrical body. Further, the bubbles may easily grow and rise by the separating plate, and the movement distance for separating the steam or the mixed gas is divided by the number of separating plates. Accordingly, the horizontal distance necessary for separating the bubbles is shortened. For this reason, it is possible to efficiently remove the bubbles and to decrease the size of the quench tank due to a decrease in the length of the cylindrical body.

In the second embodiment of the present invention, the bubbles moving along with the liquid metal rise so as to come into contact with the separating plate while the liquid metal flows substantially in the horizontal direction inside the cylindrical body, and the bubbles grow while being combined with each other on the surface of the separating plate. The separating plate is provided with the plurality of holes, and the grown bubbles rise through the holes. For example, when a plurality of the separating plates are provided in the vertical direction, the bubbles become larger as the bubbles move toward the upper separating plate. The same operation and effect are obtained even in the mesh plate. Since the rising speed of the grown bubbles becomes fast, the bubbles rise through the holes of the separating plate in a direction perpendicular to the liquid metal flow, and disappear at the free liquid level. Accordingly, it is possible to separate the bubbles moving along with the liquid metal inside the cylindrical body. Further, the bubbles may easily grow and rise by the separating plate, and the movement distance for separating the steam or the mixed gas is divided by the number of separating plates. Accordingly, the horizontal distance necessary for separating the bubbles is shortened. For this reason, it is possible to efficiently remove the bubbles and to decrease the size of the quench tank due to a decrease in the length of the cylindrical body.

In the first embodiment of the present invention, the bubbles of the liquid metal grow by the separating plate, and the grown bubbles rise along the surface of the separating plate disposed in the inclined direction and rise toward the upper separating plate through the mesh opening or the hole of the separating plate. The rising speed of the grown bubbles becomes fast, the bubbles rise through the hole of the separating plate in a direction perpendicular to the liquid metal flow, and the bubbles disappear at the free liquid level. Accordingly, it is possible to separate the bubbles moving along with the liquid metal inside the cylindrical body. Further, since the mesh opening or the hole is provided in the separating plate disposed in the inclined direction, the growth of the bubbles is promoted and the separating efficiency is further improved. Accordingly, the horizontal distance necessary for separating the bubbles is further shortened. For this reason, it is possible to efficiently remove the bubbles and to decrease the size of the quench tank due to a decrease in the length of the cylindrical body.

In the third embodiment of the present invention, since the separating plate is curved, the bubbles come into contact with the separating plate and grow while being collected at the center portion. The grown bubbles rise from the hole provided near the center and/or the hillside portion. Since the rising speed becomes fast due to the growth of the bubbles, the bubbles rise while flowing along with the liquid metal and disappear at the free liquid level. Accordingly, it is possible to separate the bubbles moving along with the liquid metal inside the cylindrical body. Even in such a configuration, the horizontal distance necessary for separating the bubbles is shortened. Accordingly, it is possible to efficiently remove the bubbles and to decrease the size of the quench tank due to a decrease in the length of the cylindrical body.

In the fourth embodiment of the present invention, the liquid metal which is introduced into the cylindrical body flows between the separating plate and the bottom surface. Since the separating plate is formed in a concave shape, the bubbles moving along with the liquid metal grow at the surface of the separating plate. Then, since the separating plate is inclined, the bubbles rise along the surface of the separating plate. Meanwhile, the liquid metal moves upward through the small hole at the hillside portion or the hole near the center as the bottom, and is extracted from the outlet. The grown bubbles are gradually enlarged on the surface of the separating plate, and rise upward through the small hole. Accordingly, it is possible to separate the bubbles moving along with the liquid metal inside the cylindrical body. Further, since the liquid metal circumferentially rotates between the separating plate and the bottom surface, it is possible to obtain a sufficient time for the collision and the growth of the bubbles. For this reason, it is possible to decrease the size of the quench tank.

In the sixth embodiment of the present invention, when the bubbles come into contact with the separating plate which is formed as the mesh plate or the punching metal plate in the vertical direction, the bubbles grow and rise on the surface of the separating plate. Accordingly, it is possible to efficiently remove the bubbles contained in the liquid metal.

In the seventh embodiment of the present invention, the flow of the liquid metal is buffered by the contact with the vane and decreases in speed until the liquid metal enters the free liquid level. For this reason, the bubbles may not easily enter from the free liquid level, and the amount of the bubbles to be separated by the separating plate decreases. Accordingly, it is possible to shorten the bubble removing time.

In the eighth embodiment of the present invention, when the target is formed by ejecting the liquid metal, the bubbles may easily move along with the liquid metal. For this reason, it is possible to efficiently remove the bubbles from the liquid metal loop by removing the bubbles using the quench tank.

The invention claimed is:

1. A quench tank which is disposed in a circulation path of a liquid metal loop
the quench tank comprising:
a tank body having a cylindrical shape, a hole at a lower side surface, and a tube at an upper side surface, the tank body configured to receive liquid metal from the tube and discharge liquid metal at the hole; and
a cylindrical body configured to receive the liquid metal at the hole, the cylindrical body being inclined so that a distal end of the cylindrical body is lower than a proximal end of the cylindrical body and configured to form a flow of the liquid metal in an axial direction of the cylindrical body, the cylindrical body being attached to the tank body at the proximal end and the distal end being oriented away from the tank body,
wherein separating plates are disposed inside the cylindrical body, the separating plates being arranged such that in a cross-sectional view of the cylindrical body from the axial direction of the cylindrical body, the separating plates are inclined relative to a vertical plane indicated by a vertical line in the cross-sectional view,
a plurality of first rectification plates extending toward a center portion of the tank body are radially provided on an inner surface of the tank body at a lower portion of the tank body with a space at the center portion of the tank body, and
a second rectification plate is provided at the hole.

2. A liquid metal loop comprising:
the quench tank according to claim 1.

3. A liquid metal loop comprising:
the quench tank according to claim 1; and
a target forming portion which forms a target by ejecting a liquid metal supplied from the quench tank to a proton beam irradiation space.

* * * * *